G. FRERICHS.
BAROVACUUMMETER.
APPLICATION FILED NOV. 3, 1908.

960,633.

Patented June 7, 1910.
2 SHEETS—SHEET 1.

Witnesses:
L. Handtrag
E. Haase

Inventor:
Gustav Frerichs

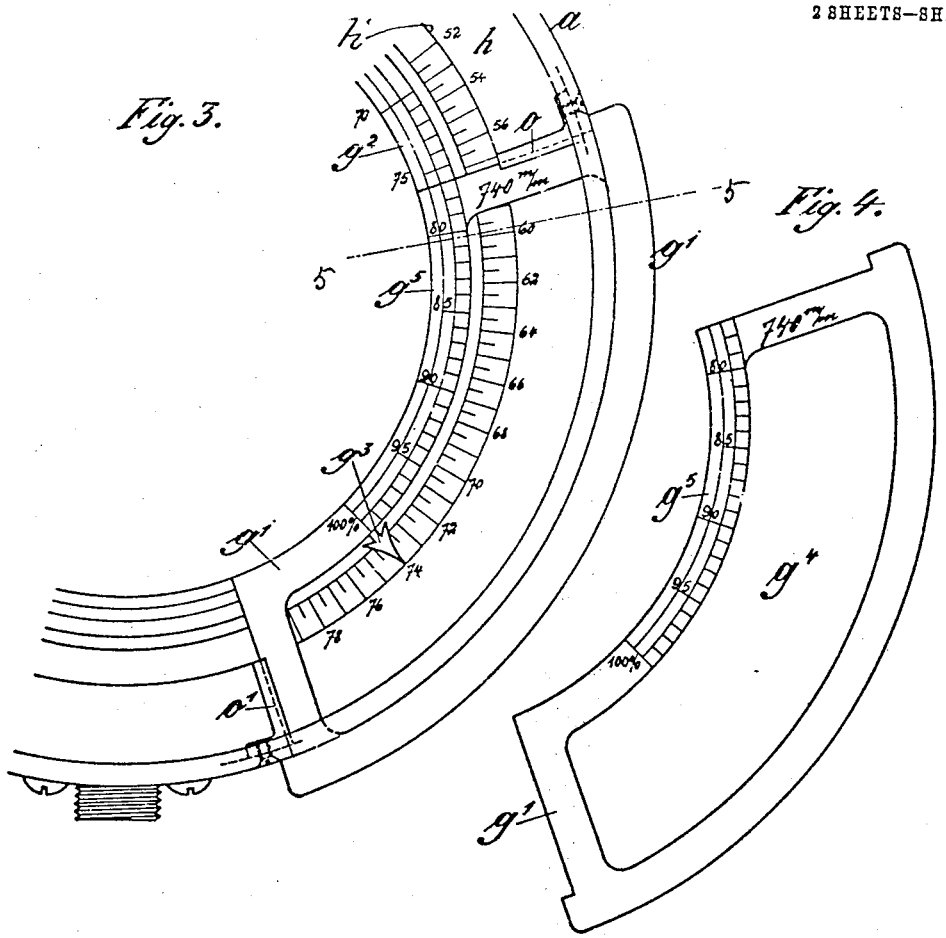
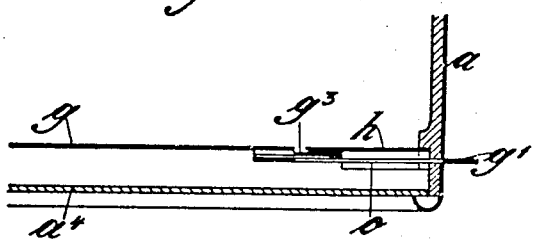

UNITED STATES PATENT OFFICE.

GUSTAV FRERICHS, OF HANOVER, GERMANY.

BAROVACUUMMETER.

960,633.  Specification of Letters Patent.  Patented June 7, 1910.

Application filed November 3, 1908. Serial No. 460,963.

*To all whom it may concern:*

Be it known that I, GUSTAV FRERICHS, civil engineer, a subject of the King of Prussia, German Emperor, and residing at No. 33 Wedekindstrasse, at Hanover, in the Kingdom of Prussia, German Empire, have invented a new and Improved Barovacuummeter, of which the following is a specification.

This invention relates to an apparatus, by means of which the height of a partial vacuum existing in a closed vessel may be given in percents of the atmospheric pressure existing at the time of measuring. The indication of a vacuummeter depends not only upon the vacuum, but upon the outer pressure also, and to attain the correct number of millimeters or of percents, a correction with respect to the just existing atmospheric pressure must be made. This is generally done by way of calculation, but it can be done also automatically, as is the case in the present invention.

In order to make my invention more clear, I refer to the accompanying drawing, in which similar characters denote similar parts throughout the several views, and in which—

Figure 1:
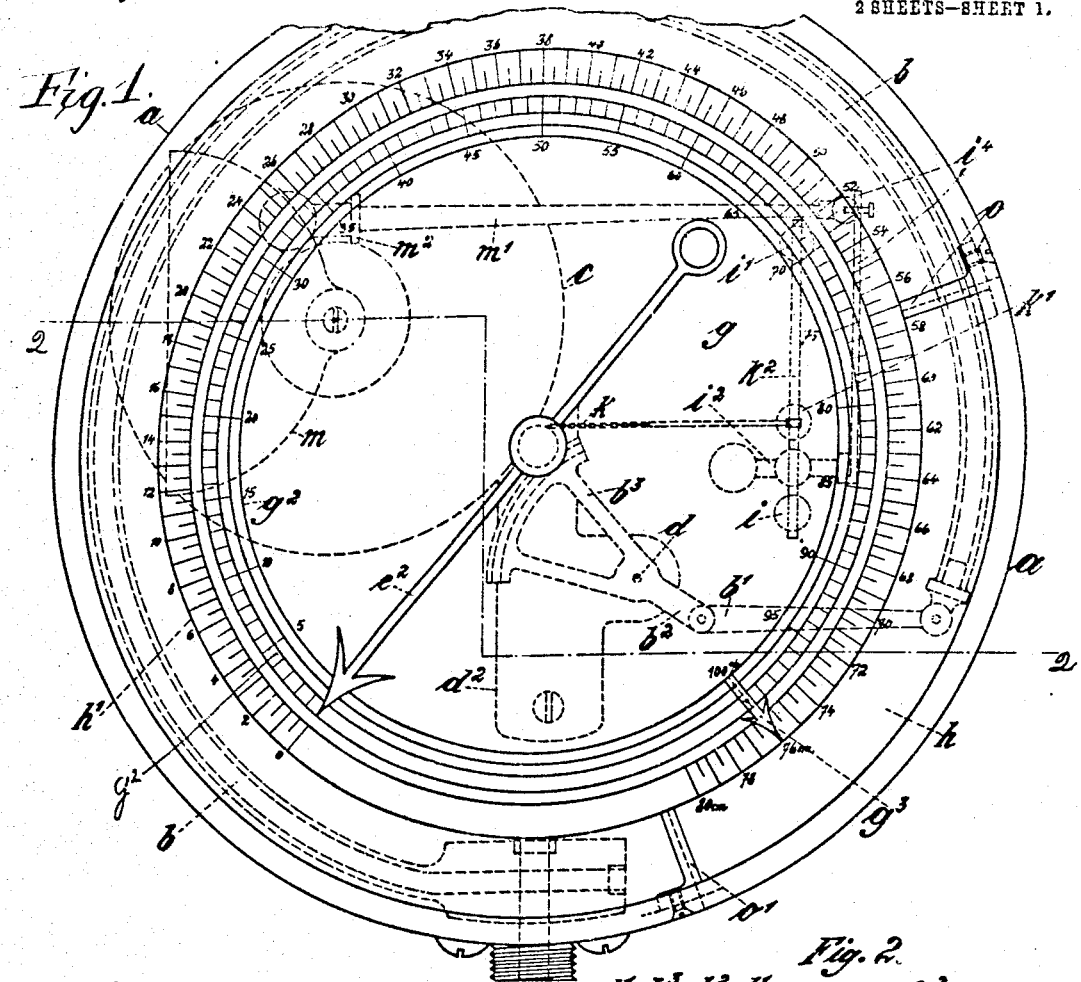
Figure 2:
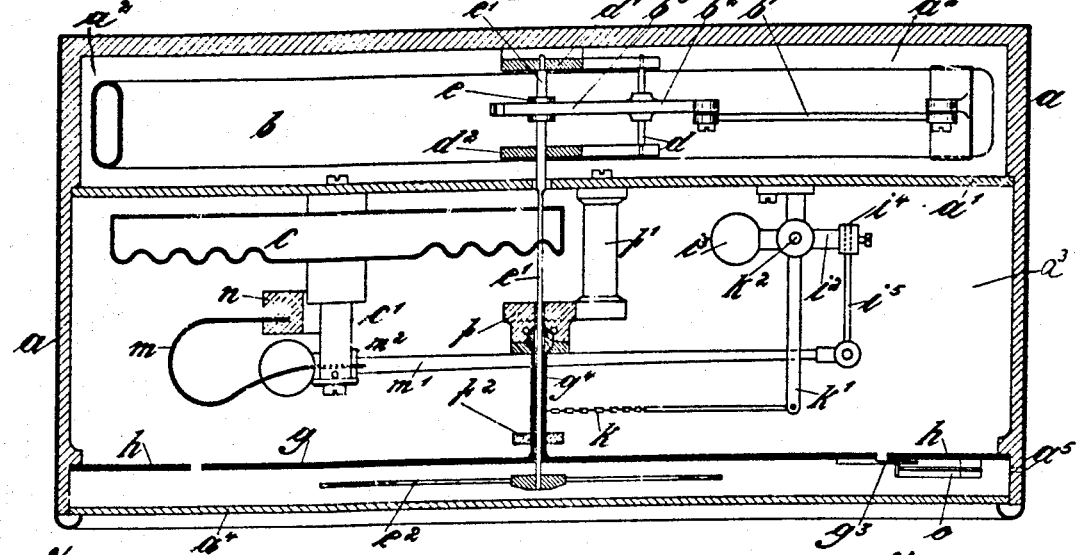

Figure 1 is a plan of one form of construction of my improved baro-vacuummeter. Fig. 2 is an inverted section in line 2—2 of Fig. 1. Fig. 3 is a diagrammatical representation of a part of Fig. 1 showing the apparatus combined with an auxiliary vacuummeter scale; Fig. 4 is a representation of such a scale, and Fig. 5 is a diagrammatical representation of a section in line 5—5 of Fig. 3.

The casing $a$ is divided by a partition-wall $a'$ into a lower compartment $a^2$ and an upper one $a^3$; the latter is closed by means of a glass-plate $a^4$. The compartment $a^2$ contains, in the form of construction shown as an example a tubular vacuummeter $b$, and the compartment $a^3$ contains in this form of construction an aneroid-barometer $c$. The free end of the vacuum-tube $b$ is connected by a rod $b'$ with a double-armed lever $b^2 b^3$ supported by means of an axle $d$ in bearing-plates $d' d^2$ secured to the casing $a$. The lever-arm $b^3$ forms a toothed sector which is in gear with a pinion $e$ fixed to a shaft $e'$ also held by said bearing-plates $d' d^2$. The shaft $e'$ extends through the partition-wall $a'$, as well as through a ball-bearing $f$ held by a column $f'$ also fixed to said wall $a'$; and the free end of the shaft $e'$ carries a pointer or hand $e^2$ rotating in front of a dial $g$ located near the glass-plate $a^4$. The dial $g$ has a circular vacuummeter-scale $g^2$ divided into percents, the length of this scale corresponding normally to a circular barometer-scale $h'$ provided upon a ring $h$ attached to the casing $a$ in the plane of the dial $g$. The hand $e^2$ serves for the vacuummeter-scale and a pointer $g^3$ attached to the disk $g$ serves for the barometer-scale.

I prefer to provide for one apparatus not only one vacuummeter-scale corresponding to the mean atmospheric pressure of the place where the apparatus is in use, but I provide moreover a certain number of vacuummeter-scales, or portions of such scales, for other atmospheric pressures such as are known to occur at that place. Suppose, for instance, the mean atmospheric pressure at a certain place be 760 mm., I provide scales for 765, 770, 775, 780 mm., and so on, as well as for 755, 750, 745 mm., and so on, it being understood that the difference need not by any means be just 5 mm., but for instance 4, or 3, or 6, or as otherwise preferred. Normally, the apparatus has the disk with the main scale for the mean atmospheric pressure. Only when intending to determine the percents of the vacuum in the closed space with which the tube $b$ is connected, that disk, when the pointer $g^3$ indicates upon the barometer-scale another atmospheric pressure, is covered with an auxiliary scale, or, more precisely, with a portion of such a scale, ($g^4$, Figs. 3 and 4). This is thus a scale the division of which corresponds better to the atmospheric pressure just indicated by the pointer $g^3$. Suppose, the pointer $g^3$ indicates 764 mm., the vacuummeter-scale for 765 mm. will be chosen; or if the pointer $g^3$ indicates 752 mm., the vacuummeter-scale for 750 mm. will be chosen, provided, the differences between the various scales amount to 5 mm. But, as already stated, this is no "*conditio sine qua non*". If one of the auxiliary vacuummeter-scales must be used, it is introduced into the casing $a$ through a lateral slot $a^5$, Fig. 2 and takes them over a portion of the barometer-scale, as well as over a portion of the main vacuummeter-scale of the disk $g$. But while this latter portion is covered by that auxiliary vacuummeter-scale, so as to form a substitute for the covered portion of the main-scale, the respective portion of the barometer-scale remains visible, as does also the pointer $g^3$, since the auxiliary vacuummeter-scale has a cut-out of sufficient size. Now, while the ring $h$ is at any rate stationary, as is also the auxiliary vacuummeter-scale perhaps employed, the disk $g$ is capable of a partial rotation, and this rotation is brought about automatically by the barometer $c$ at every change of the atmospheric pressure. The disk $g$ is secured to a hollow shaft $g^4$ held by the ball-bearing $f$ and guided by a cross-bar $f^2$ and inclosing the foremost portion of the shaft $e'$. One end of a light chain $k$ is wound around said hollow shaft $g^4$, and the other end is secured to an arm $k'$ fixed to a shaft $k^2$. This shaft is supported by bearings $i$ $i'$ and carries also a double-armed lever $i^2$ arranged at right angles to the arm $k'$. One arm of the lever $i^2$ has a counterpoise $i^3$ and the other arm is firmly connected with a rod $i^4$ extending parallelly or nearly so, to the shaft $k^2$. The rod $i^4$ has at its free end (near to the bearing $i'$) an extension $i^5$ arranged at right angles to said rod and being thus parallel to the arm $k'$. The free end of said extension $i^5$ is connected with one end of a bar $m'$ fixed at its other end to a broad, U-shaped spring $m$ by means of a connecting-piece $m^2$. One leg of this spring is secured to a rigid stationary support $n$, the other is attached to a column $c'$ fixed to the undulated top-plate of the barometer $c$.

Suppose, the atmospheric pressure increases, the top-plate of the barometer is depressed corresponding to that increase and this motion is transmitted to the bar $m'$ by the mediation of the spring $m$. The bar $m'$ is thus also depressed, i. e. moved in the direction toward the partition-wall $a'$, as are also the rods $i^5$ and $i^4$. Owing to this movement, the lever $i^2$ and the arm $k'$ are turned and thus the chain $k$ is caused to rotate the hollow shaft $g^4$, the direction of this rotation being such that the difference between the indication of the hand $c^2$ upon the scale $g^2$ and the absolutely correct indication that exactly corresponds to the just existing atmospheric pressure is reduced, that is to say, is practically nearly completely compensated.

In Fig. 1, the vacuummeter-scale corresponds to 760 millimeters, and there is no compensation necessary and does not or cannot take place so long as the atmospheric pressure amounts exactly to 760 millimeters. But to obtain always an exact statement of the percents of the vacuum, the vacuummeter scale should always exactly correspond to the atmospheric pressure just existing. To obtain this in a practically sufficient degree, I have provided auxiliary scales $g'$, of which one is shown in Fig. 4. This is such an auxiliary scale as has already been mentioned in a foregoing portion of this specification, and it is that scale corresponding to an atmospheric pressure of 740 millimeters. Now, suppose the pointer $g^3$ of the disk $g$ indicates 740 millimeters, the corresponding auxiliary scale is introduced through a slot $a^3$ (Fig. 2) into the casing $a$ where it is held by friction between and by angular pieces $o$ $o'$ (Fig. 3). The scale $g'$ has a cut-out $g^4$ (Fig. 4) through which the otherwise covered portion of the barometer-scale remains visible, and the scale proper $g^5$ of the auxiliary scale $g'$ is so divided that the numeral 100 (percents) is just opposite to the numeral 74 (centimeters) of the barometer-scale $h'$. The indication of the hand $c^2$ as to the percents of the vacuum is then absolutely correct, and the same is true with respect to every other auxiliary scale properly chosen. Suppose, the barometer indicates an atmospheric pressure of say 768 or 772 millimeters, the auxiliary vacuummeter-scale for 770 millimeters will be chosen as that nearest to those pressures and thus best fitting for the same. The hand $g^3$ stands in such a case at or over 768 or 772 millimeters, as the case may be, and the hand $c^2$ indicates upon that auxiliary vacuummeter-scale the number of the percents corresponding to that atmospheric pressure, either exactly or very nearly so.

Having now described my invention, what I claim as new, and desire to secure by Letters Patent, is:—

1. The combination with a vacuummeter, of a barometer, means adapted to cause the barometer to compensate the influence of changes of the atmospheric pressure upon the indication of the vacuummeter, and a plurality of interchangeable vacuummeter-scales each corresponding to a distinct atmospheric pressure, and being each adapted to be attached to said vacuummeter, for the purpose described.

2. The combination with a vacuummeter having a scale corresponding to a distinct atmospheric pressure, of a barometer, means adapted to cause the barometer to compensate the influence of changes of the atmospheric pressure upon the indication of the vacuummeter, and a plurality of auxiliary interchangeable vacuummeter-scales having their scales correspond to other distinct atmospheric pressures and being each adapted to be attached to said vacuummeter so as to be able to coöperate with the hand of the same, for the purpose as described.

In testimony that I claim the foregoing as my invention, I have signed my name in presence of two subscribing witnesses.

GUSTAV FRERICHS.

Witnesses:
L. HORNOLTRAG,
E. HAASE.